United States Patent [19]

Shaffer

[11] 4,428,592
[45] Jan. 31, 1984

[54] MESH REINFORCED ELASTOMERIC ELEMENT FOR OIL WELL COMPONENTS

[76] Inventor: Charles D. Shaffer, 1119 N. Raymond Ave., Fullerton, Calif. 92631

[21] Appl. No.: 385,563

[22] Filed: Jun. 7, 1982

[51] Int. Cl.³ .................... F16J 15/22; E21B 33/06
[52] U.S. Cl. ................... 277/230; 277/165; 277/212 C; 251/1 B; 251/1 A
[58] Field of Search ............ 277/138, 146, 164–166, 277/179, 192, 180, 199, 230, 212 C, DIG. 7, 181, 186, 212 R; 251/1 R, 1 B, 1 A

[56] References Cited

U.S. PATENT DOCUMENTS

| | | | |
|---|---|---|---|
| 612,687 | 10/1898 | Van Den Bosch | 277/212 C |
| 755,180 | 3/1904 | Smith et al. | 277/212 R |
| 1,520,704 | 12/1924 | Farmer | 277/212 C |
| 2,076,042 | 4/1937 | Penick et al. | 251/1 R X |
| 2,124,015 | 7/1938 | Stone et al. | 251/1 B X |
| 2,170,915 | 8/1939 | Schweitzer | |
| 2,392,146 | 1/1946 | Hall | 277/212 C X |
| 2,632,680 | 3/1953 | Smith | 277/212 C |
| 2,647,728 | 8/1953 | Smith | 251/1 B X |
| 2,674,644 | 4/1954 | Goodloe | 428/256 X |
| 2,843,349 | 7/1958 | Meyer | 251/1 B |
| 2,882,082 | 4/1959 | Poltorak et al. | 277/DIG. 7 X |
| 3,029,083 | 4/1962 | Wilde | 277/164 |
| 3,179,427 | 4/1965 | Rizzo | 277/199 |
| 3,252,707 | 5/1966 | Mirsky | 277/181 |
| 3,361,432 | 1/1968 | Usher | 277/203 |
| 3,434,729 | 3/1969 | Shaffer et al. | 277/181 |
| 3,481,824 | 12/1969 | Poltorak | 277/230 X |
| 3,490,525 | 1/1970 | Nettles | 251/1 B X |
| 3,835,291 | 9/1974 | Sciaky | 277/165 X |

FOREIGN PATENT DOCUMENTS 471341  9/1937  United Kingdom ............... 277/165

OTHER PUBLICATIONS

Shaffer Tool Works Catalog for 1960, p. 4939.

Primary Examiner—Robert S. Ward
Attorney, Agent, or Firm—Poms, Smith, Lande & Rose

[57] ABSTRACT

A composite elastomeric member for use in well apparatus and adapted to be supported by a well element having a surface for engagement with a surface of a well component, the composite member including a preshaped, reinforcing, mesh-like lamina of selected mesh density carried by and embedded in the member and extending laterally and longitudinally with respect to an axis of the body member, the lamina being bonded to the elastomeric body member and located in a selected zone of the body member to support the sealing surface against unwanted flow of elastomeric material caused by well or well apparatus pressure conditions. The preshaped wire mesh lamina may be stressed independently of the elastomeric material of the body member, may be partially exposed at said sealing surface, and may be of stainless steel.

8 Claims, 9 Drawing Figures

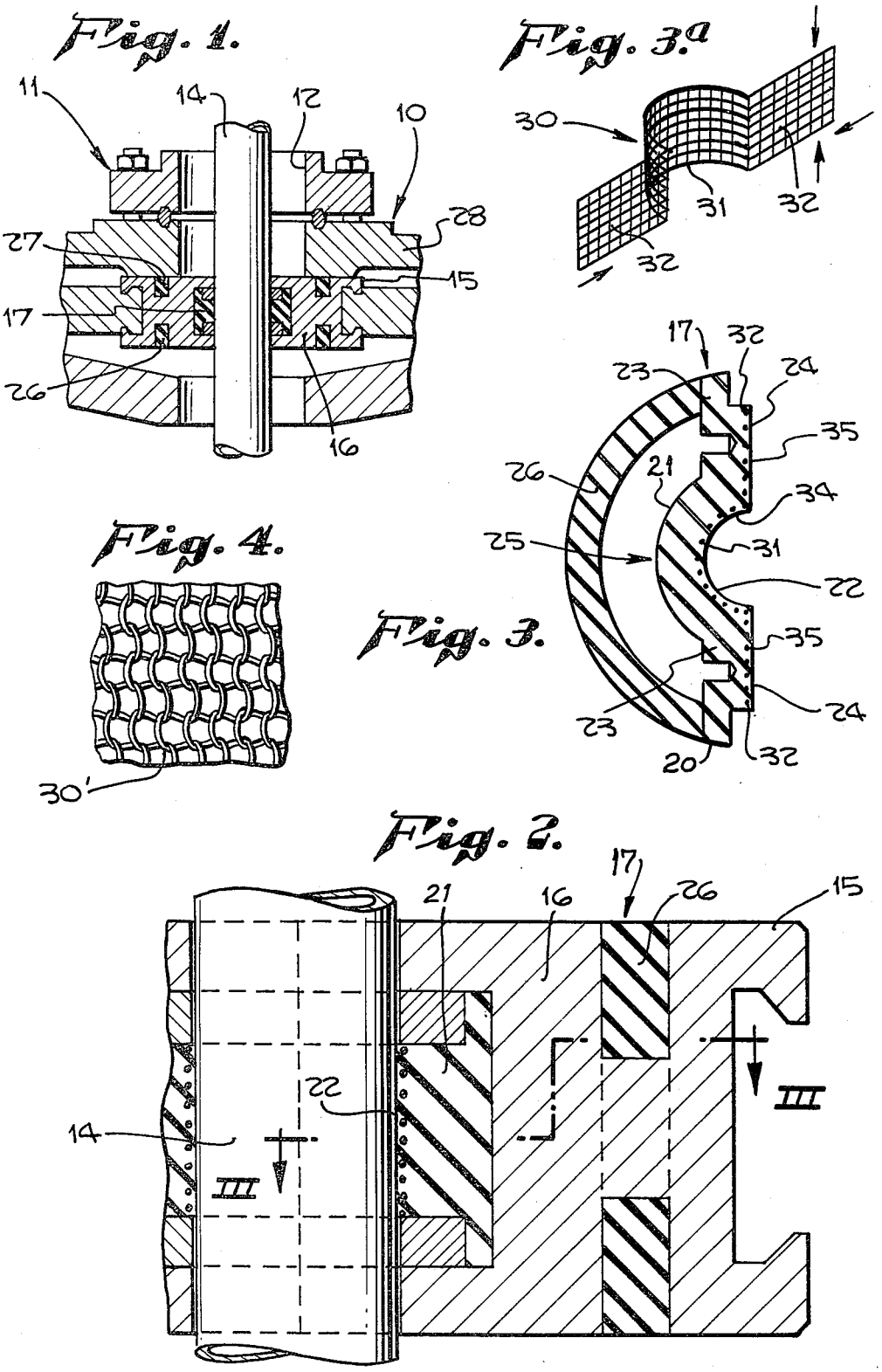

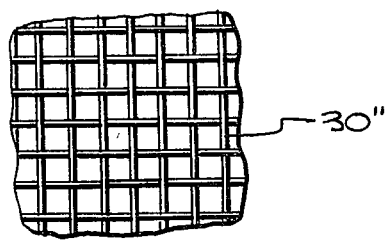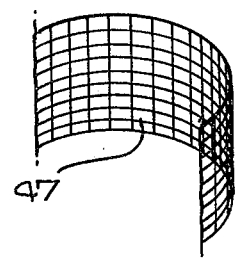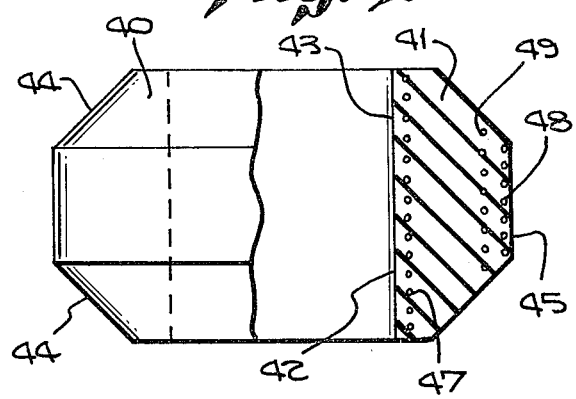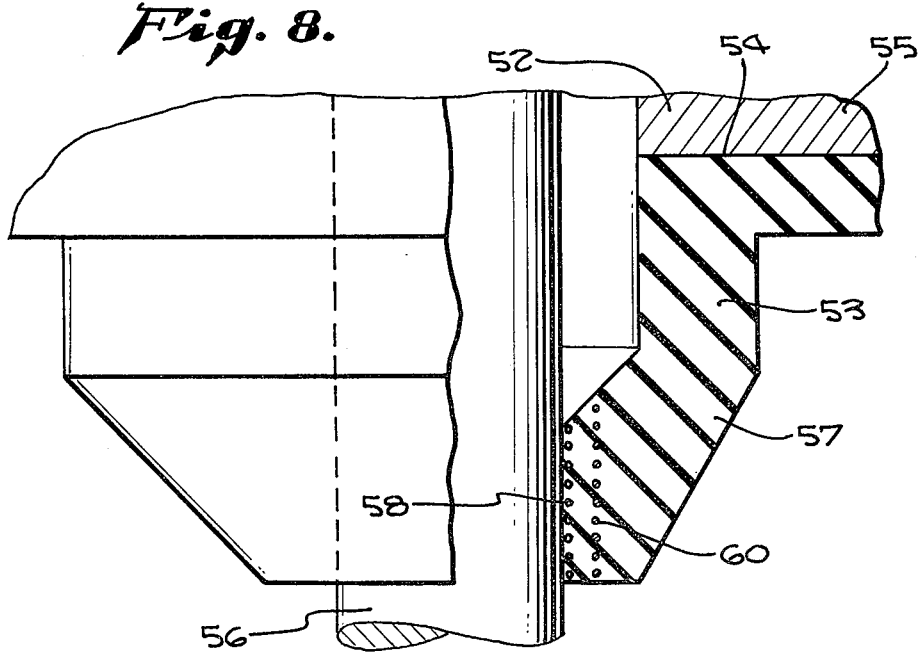

MESH REINFORCED ELASTOMERIC ELEMENT FOR OIL WELL COMPONENTS

BACKGROUND OF THE INVENTION

This invention relates generally to oil well equipment utilizing as a part thereof resilient, at least partially flowable, rubber or elastomeric material for maintaining a continuous pressure seal against a well element, such as drilling pipe, or for maintaining closure under well pressure conditions of a well casing such as in blowout preventers. The utility of the invention is not limited to the above examples or to oil well equipment.

In one example in oil drilling equipment, a continuous seal is often provided around drill pipe while the pipe is moved vertically or axially. Under such operations the sealing face of the rubber material may be ripped, torn and gouged by irregularities in the drill pipe surface and by the slightly larger diameter drill collars connecting pipe sections. Thus, under such conditions, while the resiliency of the rubber may continue to exert a sealing pressure on the drill pipe surface; however, the rubber sealing surface may become irregular and worn and the seal member must be replaced.

Blowout preventers are employed to tightly grab a drilling string or pipe under pressure to seal off the well against well fluid pressures. When the resilient face of the blowout preventer sealing rubber member is tightly pressed against a pipe for a period of time and when the blowout preventer is actuated to release position, the tight pressure contact of the sealing face of the rubber against the pipe often tends to create a suction at the sealing interfaces which sometimes tends to separate small particles of the rubber sealing face from the rubber body and thus destroy the effectiveness of the seal when the preventer is again actuated.

Such a condition may also exist when a pair of rubber rams are used to seal off the well casing when the drill pipe has been removed and the gatelike ram assemblies are urged into tight pressure contact to maintain such seal against fluid pressures developing in the well. To contain such fluid pressures, preferably the sealing faces of the ram rubbers should properly mate or interface to maintain the desired sealed shutoff.

While the material of the ram rubbers is compounded to maintain a selected standard of resiliency, yieldability and resistance to well fluids, a need was recognized for reinforcing the rubber material against the stresses imparted thereto. One prior proposed seal means for drilling heads involving a rubber stripper provided a plurality of longitudinally extending annularly spaced rods or wires of steel molded in the rubber body of stripper. Such rods provided longitudinal strength for a stripper rubber sealing element, minimized longitudinal compression of the sealing element and reinforced the rubber material of the sealing element to provide a continuous seal (See U.S. Pat. No. 3,029,083).

In another prior proposed seal means a helical spring in the form a ring-like washer was molded and embedded in the rubber material to provide reinforced resilient expansion of the stripper body while a drill collar on a drill string moved past the stripper. (See U.S. Pat. No. 2,179,915).

Reinforcement of ram rubbers to strengthen the rubber body member by using layers of suitable fabric embedded in the rubber body in spaced relation to the sealing face has also been used. (See FIG. 17 of Shaffer Tool Works Catalog, 1960, page 4939.)

Prior proposed reinforcements of rubber materials used for sealing devices in oil well equipment were of assistance but did not fully meet field requirements of durability, reliability, long life, and constant protection against the various types of fluids encountered in a well drilling operation.

SUMMARY OF INVENTION

This invention relates to the construction and fabrication of an elastomeric member reinforced in a novel manner and by novel means and primarily for use with oil well equipment to enhance and improve operational characteristics of the elastomeric member under oil well operating conditions.

More particularly, the invention relates to a reinforced elastomeric sealing means utilizing a preshaped, wire mesh lamina embedded in and bonded to the elastomeric material at selected locations to provide reliable, long life service under varying temperature and pressure conditions and while subject to contact with oil, gas, or drilling fluid of various characteristics.

The invention contemplates a resilient yieldable elastomeric rubber sealing means reinforced by one or more preshaped wire mesh forms or lamina positioned in the elastomeric material at or adjacent the sealing face thereof and/or spaced therefrom. Such a resilient elastomeric sealing means may be constructed for utilization in ram rubbers, strippers, swab cups, and packers of many different types; as for example, anchor, bypass, cups, formation, productions, and the like which include a resilient elastomeric body member.

The invention contemplates that the reinforcing wire mesh form may be preshaped in accordance with the shape of the well component with which it is to be used; as for example, a ram, a stripper, a packer and the like, so that the most effective reinforcement of the elastomeric material is achieved for the location and environment of the elastomeric sealing member.

It is, therefore, a primary object of the present invention to provide a reinforced elastomeric sealing member for use in oil well equipment in which the reinforced sealing member has an extended long life, is dimensionally stable, is resistant to deterioration of its sealing face, and its operational characteristics are effective in maintaining a desired seal.

An object of the invention is to provide an elastomeric reinforced sealing means having a construction which resists disintegration of its sealing face during operation.

Another object of the invention is to provide an elastomeric reinforced sealing member reinforced with a flexible preshaped wire mesh lamina.

Another object of the invention is to provide an elastomeric reinforced sealing member as described above wherein embedded wire mesh lamina is capable of resistance to high temperatures and pressures and to corrosion and wear caused by drilling fluids, oil, gas and other fluids, clean or abrasive, which may be encountered during a well operation.

A further object of the invention is to provide an elastomeric reinforced sealing member in which its sealing effectiveness and the useful life of the elastomeric material is increased.

A still further object of the invention is to provide a sealing member in which the elastomeric material is of a special compound which provides selected elasticity, which withstands hard usage, and which is bonded to a preshaped, stainless steel mesh of selected density.

Other objects and advantages of the present invention will become readily apparent from the following description of the drawings in which exemplary embodiments of the invention are shown.

IN THE DRAWINGS

FIG. 1 is a fragmentary sectional view of a hydraulically operated blowout preventer having ram rubber sealing means embodying this invention.

FIG. 2 is an enlarged fragmentary view of the ram means in FIG. 1 taken in the same plane as FIG. 1.

FIG. 3 is a sectional view of the elastomeric ram sealing member shown in FIGS. 1 and 2, taken in the plane indicated by line III—III of FIG. 2 with the ram block of the blowout preventer removed.

FIG. 3a is perspective view of a preshaped wire mesh lamina shown in FIG. 3.

FIG. 4 is an enlarged fragmentary view of a sectional area of one type of wire mesh for use in the sealing member of FIG. 3.

FIG. 5 is a fragmentary enlarged view of a wire mesh area of woven type which may be used in this invention.

FIG. 6 is a generally schematic perspective view of a preshaped wire mesh form or lamina which may also be used in this invention of this invention.

FIG. 7 is a view, partly in section, of a packer member equipped with the reinforcing means, such as shown in FIG. 6 of this invention.

FIG. 8 is a fragmentary view, partly in section, of a stripper means equipped with a reinforcing means of this invention.

DETAILED DESCRIPTION

FIG. 1, a ram assembly 10 for a control gate generally indicated at 11 is provided with a throughbore 12 through which a pipe 14, such as drill pipe, may pass. Ram assembly 10 includes a ram block holder 15, a block 16, and ram rubber sealing member 17. The ram block holder is connected to a position and cylinder means actuated by hydraulic fluid in well known manner (not shown). The present invention is concerned with the construction and fabrication of ram rubber 17, control gate 11 illustrating one specific example of such use.

Ram rubber 17 may comprise a specially compounded rubber or elastomeric body 20 having selected flow characteristics and compounded to resist and to be virtually unaffected by various types of fluids encountered in well operations. In this control gate example, elastomeric body 20 comprises a generally semicylindrical central body section 21, FIG. 3, having an inner semicylindrical surface 22 for sealing engagement with the cylindrical surface of pipe 14. Extending radially outwardly from the central body section 21 are radial body sections 23 having generally planar faces 24 arranged for abutting pressure sealing engagement with corresponding faces on an opposed elastomeric body forming the opposite side of the control gate, such other body being identical to that being described. It will be understood that the shape and configuration of body 20 corresponds generally to the shape of the ram block 16 in which it is carried. Further, radial portions 23 may be integrally joined by a generally semicylindrical back rubber member 26 providing a seal at 27 with the ram assembly housing 28.

In FIG. 3a, a preshaped clothlike wire mesh form or lamina 30 is shown. Wire mesh lamina 30 may comprise, in one example, a knitted wire mesh having a selected mesh density, for example, of between 30 to 100. The wire lamina 30 is preferably of stainless steel with a wire size having an exemplary diameter of between 0.004 and 0.020 inches. Wire mesh lamina 30 may be precut to a selected length and width correlated to the shape of the body 20 or the particular body zone in which the mesh 30 is to be embedded. Wire mesh lamina 30 includes a central semicylindrical portion 31 corresponding to the shape of the semicylindrical portion 22 of body 20. Wire mesh lamina 30 is also provided with radial portions 32 corresponding to radial portions 24 of the body. To some extent the knitted wire mesh lamina 30 is flexible and depending upon the tightness of the knit or woven construction, the lamina 30 has dimensional stability to maintain its general shape. To conform the shape of the wire mesh lamina 30 to that zone of the elastomeric body 20 in which it is to be embedded, the lamina 30 may be pressed in a suitable molding die to attain the desired shape and dimensions. The pressed shape is maintained by lamina 30 under normal conditions, that is, in the absence of stretching or compression forces. The shape of lamina 30, when formed, may be utilized in relaxed or stressed state, the latter state including lamina 30 under compression or tension in one or two dimensions.

Wire mesh lamina 30 may be embedded in the rubber body 20 adjacent the sealing faces 34 and 35. Such embedment of the shaped lamina 30 in the body 20 may be accomplished by well known rubber molding techniques. In such molding process, the elastomeric material of body 20 flows through the openings or interstices of the wire mesh lamina 30, is bonded thereto in the molding process, and provides sealing faces 34, 35 having a continuous elastomeric surface supported and reinforced by the wire mesh lamina 30 in close proximity to said surface. Thus, when the semicylindrical face 34 is urged into pressure sealing engagement with pipe 14 and faces 35 engage corresponding faces 35 on the opposed ram rubber 17 under ram hydraulic pressure, initially the sealed interface is formed by the reinforced ram rubber material and under selected restrained flow of rubber material correlated to the selected mesh size of lamina 30 at the faces 34, 35. Upon release of ram pressure and withdrawal of the interfacial engagement, the reinforced elastomeric material adjacent the faces 34, 35 facilitates such withdrawal because of reduced stretching or pulling apart of rubber material immediately adjacent the interface. The wire mesh lamina 30 serves to reduce free flow of the rubber during such actuation and release ram operations, and also under well fluid pressure conditions.

It should be noted that upon application of ram pressure, the elastomeric material in body 20 normally tends to flow into adjacent spaces in the ram assembly not initially occupied by the rubber. Flow of rubber material adjacent faces 34, 35 or incremental displacement thereof because of subjection to well and ram pressure is partially resisted and contained by the wire mesh lamina 30.

Semicylindrical elastomeric back member 26, which provides sealing at 27 and which extends to the radial ends of radial portions 23 of body 20, may also be provided with reinforcement of wire mesh lamina in order to resist and contain the flow of the elastomeric material at such areas when subjected to well pressures and ram pressures.

Wire mesh lamina 30 as generally indicated above may be made of an interlaced knitted wire mesh fabric as illustrated in FIG. 4 at 30'. Wire mesh 30' of knitted fabrication provides interlinked loops to provide some flexibility in three dimensions and to permit convenient adaptation of the knitted mesh to irregular shapes. Such interlinked loops also provide for selected stressing of the linkage in two directions. Thus, when embedded in an elastomeric material in a relaxed shaped unstressed state, the knitted wire mesh 30' may readily react to internal flow of rubber without determination of the expected direction of rubber flow in certain installations. Such knitted mesh may be readily preshaped to conform to the desired configuration of the elastomeric body member in which it is to be used, and preshaped in relaxed or stressed condition.

In FIG. 5 is illustrated a section of wire mesh lamina 30" illustrating a woven wire mesh such as used in screening, or the like. Such woven wire mesh may not be as flexible in three dimensions as the knitted mesh 30', but may be also utilized as reinforcement for elastomeric body members by suitably preshaping the woven mesh to the desired configuration. Such preshaping of a woven wire mesh may impose nonuniform stresses which may be of different character and magnitude than that which may be imparted to the knitted mesh 30'. it will be understood that the woven wire mesh 30" may be utilized in the same manner and for similar purposes as wire mesh 30 described hereinabove.

When the term "preshaped" is used herein in connection with wire mesh lamina 30, 30', 30", it will be understood that such preshape may include any shape, for example, a rectangular planar portion of wire mesh lamina which may be embedded in a selected zone of rubber material. While stainles steel wire mesh has been described, it will be understood that metal elements of the wire mesh may be made of other material, such as other metals or non-metals having suitable physical and chemical characteristics depending upon the stressing and environment in which the reinforced elastomeric member is to be used. The wire mesh may be precoated with a wear resistant material having lubricating properties such as "Teflon." In stripper constructions use of such "Teflon" coated mesh having portions exposed or partially exposed at the stripper face engaging the pipe passing therethrough facilities the stripping operation and provides a composite material engagement face.

In FIG. 7, is shown a packer means generally indicated at 40 and comprising a rubber or elastomeric body member 41 having a through opening 42 having a cylindrical internal face 43. Packer means 40 may be suitably shaped in cross section and in this example, includes conical faces 44 converging to a central outer cylindrical face 45. Wire mesh lamina 47 may be preshaped to cylindrical form and embedded during molding in the material of body 41 in proximity to the internal cylindrical face 43. Wire mesh lamina 48 and 49 may also be preshaped to cylindrical form and embedded in the outer circumferential portions of body 41 radially inwardly of central face 45. Wire mesh lamina 47, 48 and 49 may be of either knitted or woven form and preshaped before being placed in the mold into which rubber or elastomeric material forming the body 41 is poured to form the packer means 40. It will be understood that the interstices of the mesh wire lamina 47, 48 and 49 are filled with the elastomeric material and are bonded thereto. It will be apparent that flow of rubber at the internal cylindrical face 43 and adjacent the circumferential outer face 45 of body 41 under well pressures is contained or restricted by the wire mesh lamina and the sealing interfacial engagement of the packer means with its associated well parts is reinforced and enhanced by the wire mesh lamina.

In FIG. 8, a stripper member 52 is shown in which an elastomeric body member 53 is bonded at 54 to a support member 55 for positioning the stripper member relative to a pipe 56. The body member 53 includes a downwardly and radially inwardly extending conical portion 57 having a sealing face 58 adapted to sealingly engage the surface of pipe 56. The radially inturned conical portion 57 flexibly bears against pipe 56 and is adapted to yield radially outwardly during passage of a drill collar or other enlargement on pipe 56. The conical portion 57 may be provided with wire mesh lamina 60 proximate to the sealing face 58 and in the zone of the cone shaped portion 57 which is subject to well pressures and serves to contain and limit flow of rubber at sealing face 58. It will be readily apparent that the wire mesh lamina 60 may be preshaped and molded as briefly described above.

In such a stripper member 52, the wire mesh lamina 60 may be formed of more than one spaced lamina sections so that expansion and contraction of the stripper member may be more readily accommodated without resulting in separation of the bond between the rubber body and the wire mesh lamina or partial disintegration of the wear face.

In the reinforcement of rubber or elastomeric members utilizing a preshaped wire mesh lamina suitably located in a zone for restricting or containing flow of rubber against ram or well pressures, the wire mesh lamina after preshaping may be installed in a rubber mold in a position wherein the preshaped wire mesh lamina wire may be placed under stress, compression or tension. In the knitted form of wire mesh lamina, it will be apparent that such compression of the preshaped form may cause partial collapse of the interlinked structure of the mesh. Thus, when a compressed preshaped knitted wire mesh lamina is embedded in a body of elastomeric material and the elastomeric material is subjected to stresses from well pressures or ram pressures, the compressed reinforcement may respond by relieving its compressed state in part during such flow of elastomeric material and may maintain the bond between the elastomeric material and mesh to substantially reduce any stress strains which might be imparted to the wire mesh lamina and adjacent rubber.

It will be understood that the location of the wire mesh form or lamina in the elastomeric body member may vary depending upon whether the body member is used in a blowout preventer, a control gate, a stripper, one of the many forms and types of packers, and other devices in which an elastomeric body member is subjected to well fluid pressures and/or stresses applied by associated equipment. In application of the wire mesh lamina at or adjacent a sealing face, there may be some installations where some exposure of stainless steel wire mesh surfaces may be acceptable to provide a sealing face having long life and wear characteristics. In other applications, the wire mesh lamina may be located in a stressed zone within the elastomeric body member to contain and restrain the flow of elastomeric material. In such a stressed zone, the preshaped wire mesh lamina may be in relaxed, compressed, or pretensioned condition.

Various changes and modifications may be made in the reinforced elastomeric body described above which come within the spirit of this invention and all such changes and modifications coming within the scope of the appended claims are embraced thereby.

I claim:

1. A composite elastomeric body means for use in a ram assembly for a blowout preventer and/or control gates having opposed ram blocks movably actuated by pressure fluid to close on a cylindrical pipe surface having an axis normal to the movement of the ram blocks and to provide a seal thereabout during longitudinal and rotational movement of the pipe relative thereto, comprising:

an integral elastomeric body member contained by said ram block and having a semi-circular sealing face adapted to be pressed against the cylindrical surface of said pipe and having planar diametrical end sealing faces adapted to be pressed against the corresponding end faces of an opposed similar elastomeric body member;

and a meshlike lamina of selected density carried by and embedded in said elastomeric body member in close proximity to said semi-circular and end sealing faces;

said lamina at said end faces providing reinforcement of pressure sealing at said end faces along a diametric plane in closed position of said ram blocks;

and said lamina reinforcing said semi-circular face for pressure sealing engagement against said cylindrical pipe surface and resistant to relative longitudinal and rotational movement of said pipe.

2. In a sealing means for well apparatus, the combination of:

a body means of elastomeric material having a resilient yieldable sealing face for engagement with a cylindrical surface of a well pipe to be sealed under conditions of longitudinal and rotational relative movement there between;

and pre-shaped reinforcing means carried by, imbedded with, and bonded to said elastomeric body member at the side of said body which is in proximity to said sealing face, said reinforcing means including a wire mesh lamina having wire lamina elements extending laterally and longitudinally across said elastomeric body means behind said sealing face for supporting said sealing face to resist unwanted flow of elastomeric material longitudinally of said axis of said well pipe and to resist unwanted flow of said material rotationally with respect to said axis, and to provide a wear resistant composite sealing face.

3. A sealing means as stated in claim 2 in which the proximity of said wire mesh lamina to said sealing face is such that surface portions of said lamina may be exposed after initial wear whereby said sealing face comprises a composite wear resistant surface of elastomeric material and metal.

4. A sealing means as stated in claim 2 wherein said wire mesh lamina includes wire having a diameter of between 0.004 and 0.012 inches.

5. A sealing means as stated in claim 2 wherein said wire mesh lamina has a mesh density of between 30 to 140.

6. A sealing means as stated in claim 2 wherein said wire mesh lamina is of knitted form.

7. A sealing means as stated in claim 2 wherein said reinforcing means includes a plurality of said wire mesh lamina, spaced from said sealing face and corresponding in configuration thereto.

8. A means as stated in claim 2 wherein said lamina comprises a plurality of spaced lamina sections affording expansion and contraction of said elastomeric material.

* * * * *